United States Patent Office 3,463,647
Patented Aug. 26, 1969

3,463,647
CRYSTALLIZABLE ENAMELS FOR GLASS-CERAMICS
Raymond Kosiorek, Bridgeville, and John I. Loughman, Washington, Pa., assignors to B. F. Drakenfeld & Company, Washington, Pa., a corporation of New York
No Drawing. Filed Feb. 2, 1966, Ser. No. 524,480
Int. Cl. C03c *3/04;* C04b *35/14*
U.S. Cl. 106—48                                7 Claims

ABSTRACT OF THE DISCLOSURE

Enamels for glass-ceramic articles are provided by compositions consisting essentially of, by weight, on the oxide basis, 40 to 67 percent of $SiO_2$, 0.1 to 10 percent of $B_2O_3$, 17 to 31 percent of $Al_2O_3$, 3 to 13 percent of $Li_2O$, 0.1 to 9 percent of $TiO_2$, and 0.1 to 11 percent of $Bi_2O_3$ in proportions adapted to be converted to beta-eucryptite as at least the major phase by a thermally induced nucleation and crystallization.

---

The term glass-ceramics is used in the ceramic field to designate products originating as completely vitreous glasses of special compositions made by conventional glass-making procedures but which are thereafter converted by heat treatment to a predominantly crystalline state. Batches for making glass-ceramics contain a nucleating agent together with constituents of inorganic compounds, other than that agent, which usually constitute the major proportion of the glass as made, which can be crystallized from the glass by the nucleating agent. Such a batch is melted to form the glass which is usually transparent and colorless and is referred to in the trade as "green glass." The green glass is converted to a glass-ceramic by a controlled heat treatment at a temperature to nucleate the said agent and at a temperature at which crystallization of the inorganic compound or compounds is initiated by the nucleating agent. The result is a substantially crystalline product made up of very small interlocked crystals, typically about 0.1 to 20 microns in diameter.

One procedure for making glass-ceramics is described in Patent No. 2,920,971 to S. D. Stookey, which describes making glass-ceramics using titanium dioxide as the nucleating agent.

Glass-ceramics possess a unique combination of physical properties which distinguish them from conventional glasses and conventional ceramics. A particularly valuable characteristic is that of especially low coefficients of linear expansion, of the order of minus $7 \times 10^{-7}/°$ C. to plus $120 \times 10^{-7}/°$ C. This property coupled with their non-porous nature, fine grained crystalline structure, glossy surface, opacity and resistance to thermal shock in conjunction with greater hardness, scratch resistance and strength retention to higher temperatures than exhibited by conventional glasses, has resulted during recent years in the use of glass-ceramics on an extensive scale for making dinnerware, cookingware and ovenware, and other articles where ease of maintenance, chemical durability, stability at high temperatures and shock resistance are desirable.

For many years glass articles have been decorated with enamels having coefficients of linear expansion ranging, generally, from about $50 \times 10^{-7}/°$ C. to about $120 \times 10^{-7}/°$ C., depending upon the coefficient of expansion of the glass to which they are applied. For such purposes it is important that the coefficients of expansion of the glass and of the enamel be at least close to one another because if such agreement does not exist the enamel may craze and even weaken the substrate glass. Generally it is best that the coefficient of the enamel be slightly below that of the glass.

The same situation prevails in the case of glass-ceramics, i.e., enamels used with them must have coefficients of expansion matching or in the term of the trade "fitting," those of the glass-ceramics, otherwise the spread between them may create seriously objectionable stresses; for instance the enamel film may be impaired by crazing. From what has been said it will be understood that enamels satisfactory for conventional glasses do not suffice for the decoration of glass-ceramics.

It is among the objects of this invention to provide enamels for glass-ceramics which have coefficients of expansion fitting those of the glass-ceramics with which they are to be used, which are prepared as truly vitreous glasses but which can be crystallized by a controlled thermal cycle comparable in function with the time-temperature cycles applied to the crystallizable green glass substrates of glass-ceramics, which adhere well to the glass-ceramic and possess good film properties, which are produced by the methods commonly used in making ordinary glass enamels, and may be applied to the crystallized glass-ceramic by any of the procedures used in decorating conventional glass.

A particular object is to provide crystallizable enamels which after crystallization contain beta-eucryptite as at least the major crystalline phase.

Still another object is to provide crystallizable glass enamels in accordance with the foregoing objects which are inherently adapted upon undergoing an exchange of constituent between the glass-ceramic and the enamel to compensate for an accompanying increase of thermal expansion coefficient and thereby to provide the necessary fit between the two.

A further object is to provide such crystallizable glass enamels the molten viscosities of which are lower than those of the green glass substrate.

Yet another object is to provide glass-ceramics with a coating of enamel having beta-eucryptite as at least its major crystal phase.

Other objects will be recognized from the following specification.

The invention is predicated upon our discovery that crystallizable enamels in conformity with the objects of the invention may be made from compositions which after being belted are vitreous but which can be crystallized by heat treatment to contain beta-eucryptite ($Li_2O.Al_2O_3.2SiO_2$) as the main or substantially only crystalline phase. These new enamels may be made from base compositions of, by weight, on the oxide basis:

| | Percent |
|---|---|
| $SiO_2$ | 40–67 |
| $B_2O_3$ | 0.1–10 |
| $Al_2O_3$ | 17–31 |
| $Li_2O$ | 3–13 |
| $TiO_2$ | 0.1–9 |

The following compositions are given as examples of crystallizable glass enamels which will crystallize beta-eucryptite upon heat treating the green glass. All thermal expansion measurements of these and other examples were made using the ASTM method.

Lead oxide and magnesium oxide also act to reduce glass viscosity with only a small rise in thermal expansion. Only small amounts of these active compounds can be used to prevent an excessive rise in expansion.

|  | A | | B | | C | | D | |
|---|---|---|---|---|---|---|---|---|
|  | Wt. | Percent oxide | Wt. | Percent oxide | Wt. | Percent oxide | Wt. | Percent oxide |
| $SiO_2$ | 240 | 61.8 | 210 | 58.6 | 120 | 40.9 | 360 | 53.89 |
| $B_2O_3$ | 22 | 5.7 | 22 | 6.1 | 22 | 7.5 | 6 | 0 |
| $Al_2O_3$ | 80 | 20.6 | 80 | 22.4 | 80 | 27.3 | 160 | 23.9 |
| $Li_2O$ | 26 | 6.7 | 26 | 7.3 | 26 | 8.9 | 53 | |
| $TiO_2$ | 20 | 5.2 | 20 | 5.6 | 20 | 6.8 | 40 | |
| $Bi_2O_3$ |  |  |  |  | 25 | 8.5 | 50 | |
| Thermal Expansion (° C.) | $10.7 \times 10^{-7}$ | | $10.1 \times 10^{-7}$ | | $9.3 \times 10^{-6}$ | | $5.6 \times 10^{-7}$ | |

The raw materials customarily used in making enamels are selected within the foregoing base composition range to provide compositions which when melted, nucleated and crystallized will have beta-eucryptite as at least the major crystalline phase ($Li_2O.Al_2O_3.2SiO_2$), which is readily determinable by X-ray analysis.

The $TiO_2$ in the basic batch composition acts as the nucleating agent. Any given batch may contain an amount of spodumene ($Li_2O.Al_2O_3.4SiO_2$) but as long as beta-eucryptite is the major crystalline phase the objects of the invention will be attained; of course, beta-eucryptite may be essentially the only crystalline phase in the product.

Some glass-ceramic compositions of the same low expansion coefficient used for making dinnerware, for example, may show a tendency to undergo an exchange with a crystallizable enamel. That is, there is a migration of a constituent from the enamel to the glass, or more likely the reverse with an attendant increase in the coefficient of expansion of the enamel with resultant crazing. The low expansion beta-eucryptite enamels of this invention are thus desirable to compensate for the expansion increase due to the aforesaid exchange.

Many of the active fluxing agents used in the glass industry can be incorporated into the above base formula. For example, bismuth oxide added to the base formula reduces the time and temperature necessary to melt the raw batch, and lowers the molten glass viscosity without a significant increase in expansion.

Cadmium oxide added to the base formula in conjunction with the bismuth oxide tends to further intensify reduction of the time and temperature necessary for melting as well as lowering the viscosity farther. The major action of cadmium oxide is a drastic reduction of thermal expansion. The thermal expansion of the crystallized glass can be lowered from plus $5.6 \times 10^{-7}/°$ C. to minus $24.3 \times 10^{-7}/°$ C. by its use.

Compositions within the invention using several of these fluxing agents are given including the resulting expansion after heat treatment.

|  | E | | F | | G | |
|---|---|---|---|---|---|---|
|  | Wt. | Percent oxide | Wt. | Percent oxide | Wt. | Percent oxide |
| $SiO_2$ | 360 | 54.7 | 360 | 53.0 | 360 | 51.5 |
| $B_2O_3$ | 6 | 0.9 | 6 | 0.9 | 6 | 0.9 |
| $Al_2O_3$ | 160 | 24.3 | 160 | 23.6 | 160 | 22.9 |
| $Li_2O$ | 53 | 8.0 | 53 | 7.8 | 53 | 7.6 |
| $TiO_2$ | 10 | 1.5 | 10 | 1.5 | 10 | 1.4 |
| $Bi_2O_3$ | 50 | 7.6 | 50 | 7.4 | 50 | 7.2 |
| CdO | 20 | 3.0 | 40 | 5.9 | 60 | 8.6 |
| PbO |  |  |  |  |  |  |
| Thermal expansion | $-24.3 \times 10^{-7}$ | | $-16.1 \times 10^{-7}$ | | $-3.4 \times 10^{-7}$ | |

|  | H | | I | | J | |
|---|---|---|---|---|---|---|
|  | Wt. | Percent oxide | Wt. | Percent oxide | Wt. | Percent oxide |
| $SiO_2$ | 360 | 53.8 | 360 | 53.0 | 360 | 52.3 |
| $B_2O_3$ | 6 | 0.9 | 6 | 0.9 | 6 | 0.9 |
| $Al_2O_3$ | 160 | 23.9 | 160 | 23.6 | 160 | 23.2 |
| $Li_2O$ | 53 | 7.8 | 53 | 7.8 | 53 | 7.7 |
| $TiO_2$ | 10 | 1.5 | 10 | 1.5 | 10 | 1.4 |
| $Bi_2O_3$ | 50 | 7.5 | 50 | 7.4 | 50 | 7.2 |
| CdO | 20 | 3.0 | 20 | 2.9 | 20 | 2.9 |
| PbO | 10 | 1.5 | 20 | 2.9 | 30 | 4.4 |
| Thermal expansion | $-13.7 \times 10^{-7}$ | | $-5.5 \times 10^{-7}$ | | $-14.9 \times 10^{-7}$ | |

Cobalt oxide is an active fluxing agent which imparts a blue or lavender color to the finished enamel without increasing the thermal expansion.

This invention is exemplified also by the following examples:

|  | K | | L | |
|---|---|---|---|---|
|  | Wt. | Percent oxide | Wt. | Percent oxide |
| $SiO_2$ | 360 | 53.8 | 360 | 53.0 |
| $B_2O_3$ | 6 | 0.9 | 6 | 0.9 |
| $Al_2O_3$ | 160 | 23.9 | 160 | 23.6 |
| $Li_2O$ | 53 | 7.9 | 53 | 7.8 |
| $TiO_2$ | 10 | 1.5 | 10 | 1.5 |
| $Bi_2O_3$ | 50 | 7.5 | 50 | 7.4 |
| CdO | 20 | 3.0 | 20 | 2.9 |
| $Co_3O_4$ | 10 | 1.5 | 20 | 2.9 |
| Thermal expansion (° C.) | $-18.3 \times 10^{-7}$ | | $-25.1 \times 10^{-7}$ | |

$MnO_2$ may be used also to impart color to the enamel. Several other well known glass coloring oxides can be added to achieve pale colors without adding pigments.

Crystallization cycles can vary from several minutes to several hours, but long cycles are usually productive of lower thermal expansions. The heat treatment must include a high temperature glossing fire to fuse enamel particles, a low temperature to nucleate the enamel, and finally an increased temperature necessary for crystallization.

Excellent results are to be had with several of the above compositions using the following crystallization cycle:

| | |
|---|---|
| 2000° F. | 20 minutes—gloss. |
| 2000° F.–900° F. | 15 minutes—cooling. |
| Hold at 900° F. | 1 hour—nucleation. |
| 900° F.–975° F. | ½ hour—crystallization. |
| 975° F.–1050° F. | ½ hour. |
| 1050° F.–1125° F. | Do. |
| 1125° F.–1200° F. | Do. |
| 1200° F.–1275° F. | Do. |
| 1275° F.–1350° F. | Do. |
| 1350° F.–1425° F. | Do. |
| 1500° F.–1600° F. | Do. |
| Hold at 1600° F. | 2 hours. |
| Cool to room temperature. | |

In general, crystallizable enamels which crystallize beta-eucryptite and exhibit a wide range of negative expansions can be made from compositions having on the oxide basis the following composition by weight:

| | Percent |
|---|---|
| $SiO_2$ | 40.0–67 |
| $B_2O_3$ | 0.1–10 |
| $Al_2O_3$ | 17.0–31 |
| $Li_2O$ | 3.0–13 |
| $TiO_2$ | 0.1–9 |
| $Bi_2O_3$ | 0.1–11 |
| CdO | 0.1–6 |
| PbO | 0.1–6 |
| $Co_3O_4$ | 0–4 |
| MgO | 0.1–6 |

BaO may replace MgO, or both may be used in a total amount up to about 6%.

The enamels may be produced by pot, crucible, or continuous flow melt methods well known in the enamel art, and proper glass formation and viscosity attainment can usually be developed by heating between three and four hours at 1540° C. They are then water cracked and ground to an extremely fine particle size in accordance with usual enamel practices. In this condition the compositions are glasses in a state comparable to that of the green glass used in making glass-ceramics.

These enamels exhibit good adherence and film properties when used as enamels for glass-ceramics, they possess the necessary low coefficient of expansion for compatibility with glass-ceramics, and they can be crystallized by application of a proper nucleation and crystallization heat treatment.

A particular feature of the invention resides, as indicated above, in our discovery that bismuth oxide and cadmium oxide are particularly valuable constituents of our enamels in that they reduce their molten viscosity which in turn improves nucleation and crystallization and aids in the development of the proper coefficient of expansion.

The enamels may be provided in a range of colors by mill additions of coloring compositions as is standard in the glass enamel trade. Examples of such colors, commonly referred to as oxides or ceramic pigments, are a brown consisting of ferric oxide, chromium oxide, zinc oxide and manganese dioxide; yellow consisting of a praseodymium-zirconium silicate; blue green consisting of alumina, zinc oxide, cobalt oxide, chromium oxide and magnesia; and black oxide consisting of ferric oxide, chromium oxide and cobalt oxide.

These enamels may be applied to the crystallized glass-ceramic by any of the methods used in applying enamels to conventional glasses, as by brush, roller, stencil, decalcomania, dusting or spraying a suspension of the enamel in a squeegee paste diluted with turpentines. After the enamel has been applied crystallization of the enamel film is accomplished by a controlled heat treatment productive of nucleation and crystallization just as in the case of glass-ceramics such as that exemplified above. As known in the glass-ceramic art, the exact time and temperature of this cycle may vary somewhat with variations in the composition of the enamel but these are factors that are well understood in the art and are easily determined for any given enamel.

We claim:

1. A crystallizable glass enamel for glass-ceramics consisting essentially of, by weight, on the oxide basis 40 to 67 percent of $SiO_2$, 0.1 to 10 percent of $B_2O_3$, 17 to 31 percent of $Al_2O_3$, 3 to 13 percent of $Li_2O$, 0.1 to 9 percent of $TiO_2$, and 0.1 to 11 percent of $Bi_2O_3$ in proportions adapted to be converted to beta-eucryptite as at least the major phase by a thermally induced nucleation and crystallization.

2. A crystallizable glass enamel for glass-ceramics in accordance with claim 1, the glass containing also from 0.1 to 6 percent of CdO.

3. A crystallizable glass enamel for glass-ceramics according to claim 1, containing also 0.1 to 6 percent PbO.

4. A crystallizable glass enamel for glass-ceramics according to claim 1, containing up to 4 percent of $Co_3O_4$.

5. A crystallizable glass enamel for glass-ceramics according to claim 1, containing 0.1 to 6 percent of at least one member of the group MgO and BaO.

6. A crystallizable glass enamel for glass-ceramic consisting essentially of, by weight, on the oxide basis 40 to 67 percent of $SiO_2$, 0.1 to 10 percent of $B_2O_3$, 17 to 31 percent of $Al_2O_3$, 3 to 13 percent of $Li_2O$, 0.1 to 9 percent of $TiO_2$, 0.1 to 11 percent of $Bi_2O_3$, 0.1 to 6 percent of CdO, 0.1 to 6 percent of PbO, up to 4 percent of $Co_3O_4$, and 0.1 to 6 percent of a substance of the group MgO and BaO in proportions adapted to be converted to beta-eucryptite a sat least the major phase by a thermally induced nucleation and crystallization.

7. That method of decorating a glass-ceramic article comprising applying to a surface of said article a coating of glass enamel consisting essentially of, by weight, on the oxide basis 40 to 67 percent of $SiO_2$, 0.1 to 10 percent of $B_2O_3$, 17 to 31 percent of $Al_2O_3$, 3 to 13 percent of $Li_2O$, 0.1 to 9 percent of $TiO_2$, 0.1 to 11 percent of $Bi_2O_3$, 0.1 to 6 percent of CdO, 0.1 to 6 percent of PbO, up to 4 percent of $Co_3O_4$, and 0.1 to 6 percent of a substance of the group MgO and BaO, in proportions adapted to be converted to beta-eucryptite as at least the major phase by a thermally induced nucleation and crystallization, subjecting said coated article to a nucleating heat treatment and then to a crystallizaion heat treament and thereby converting said coating to beta-eucryptite as at least its major crystalline phase.

References Cited

UNITED STATES PATENTS

| | | | |
|---|---|---|---|
| 2,846,325 | 8/1958 | Bennett et al. | 106—54 |
| 3,384,508 | 5/1968 | Bopp et al. | 106—139 X |
| 3,428,466 | 2/1969 | Wolf et al. | 106—48 |

OTHER REFERENCES

Eppler, R. A., Glass Foundation and Recrystallization in the Lithium Metasilicate Region of the System $Li_2O$-$Al_2O_3$-$SiO_2$, in J. Amer. Cer. Soc., 46, (2) 1963, pp. 97–101.

HELEN M. McCARTHY, Primary Examiner

W. R. SATTERFIELD, Assistant Examiner

U.S. Cl. X.R.

106—39, 54; 117—125

PO-1050
(5/69)

UNITED STATES PATENT OFFICE
CERTIFICATE OF CORRECTION

Patent No. 3,463,647      Dated August 26, 1969

Inventor(s) Raymond Kosiorek and John I. Loughman

It is certified that error appears in the above-identified patent and that said Letters Patent are hereby corrected as shown below:

Column 2, line 55, the word "belted" should be --melted--.

In the table containing composition A, B, C and D, the last line representing thermal expansion (°C.) should read as follows, --The values stated applying to Columns A, B, C and D, respectively $10.7 \times 10^{-7}/°C.$    $10.1 \times 10^{-7}/°C.$    $9.3 \times 10^{-7}/°C.$    $5.6 \times 10^{-7}/°C.$

SIGNED AND
SEALED
JUN 2 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,463,647                          August 26, 1969

Raymond Kosiorek et al.

It is certified that error appears in the above identified patent and that said Letters Patent are hereby corrected as shown below:

In the heading to the printed specification, lines 5 and 6, "assignors to B. F. Drakenfeld & Company, Washington, Pa., a corporation of New York" should read -- assignors, by mesne assignments, to Hercules Incorporated, Wilmington, Del., a corporation of Delaware --.

Signed and sealed this 12th day of January 1971.

(SEAL)
Attest:

Edward M. Fletcher, Jr.
Attesting Officer

WILLIAM E. SCHUYLER, JR.
Commissioner of Patents